(12) United States Patent
Moreton et al.

(10) Patent No.: US 7,324,105 B1
(45) Date of Patent: Jan. 29, 2008

(54) NEIGHBOR AND EDGE INDEXING

(75) Inventors: Henry P. Moreton, Woodside, CA (US); Dominic Acocella, Blainville (CA); Justin Scott Legakis, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 392 days.

(21) Appl. No.: 10/727,679

(22) Filed: Dec. 4, 2003

Related U.S. Application Data

(60) Provisional application No. 60/462,527, filed on Apr. 10, 2003.

(51) Int. Cl.
*G06T 17/00* (2006.01)
*G06T 17/20* (2006.01)

(52) U.S. Cl. .................................... 345/420; 345/423
(58) Field of Classification Search ................ 345/420
See application file for complete search history.

(56) References Cited

U.S. PATENT DOCUMENTS

| | | | | |
|---|---|---|---|---|
| 5,506,947 A | * | 4/1996 | Taubin | 345/441 |
| 5,801,714 A | * | 9/1998 | Holt | 345/501 |
| 5,821,940 A | * | 10/1998 | Morgan et al. | 345/420 |
| 5,886,702 A | * | 3/1999 | Migdal et al. | 345/423 |
| 6,047,088 A | * | 4/2000 | van Beek et al. | 382/243 |
| 6,262,737 B1 | * | 7/2001 | Li et al. | 345/419 |
| 6,307,555 B1 | * | 10/2001 | Lee | 345/423 |
| 6,362,823 B1 | * | 3/2002 | Johnson et al. | 345/440 |
| 6,389,154 B1 | * | 5/2002 | Stam | 382/108 |
| 6,452,596 B1 | * | 9/2002 | Gueziec et al. | 345/440 |
| 6,553,337 B1 | * | 4/2003 | Lounsbery | 703/2 |
| 6,738,062 B1 | * | 5/2004 | Moreton | 345/423 |
| 6,825,839 B2 | * | 11/2004 | Huang et al. | 345/423 |
| 6,876,956 B1 | * | 4/2005 | Cirak et al. | 703/2 |
| 6,900,810 B1 | * | 5/2005 | Moreton et al. | 345/522 |
| 6,940,515 B1 | * | 9/2005 | Moreton et al. | 345/522 |
| 6,995,761 B1 | * | 2/2006 | Schroeder et al. | 345/419 |
| 2003/0011589 A1 | * | 1/2003 | Desbrun et al. | 345/418 |
| 2003/0011592 A1 | * | 1/2003 | Southwell et al. | 345/420 |

OTHER PUBLICATIONS

Catmull, E., et al., "Recursively generated B-spline surfaces on arbitrary topological meshes," Computer Aided Design, vol. 10, pp. 350-355, 1978.

Halstead, Mark, et al., "Efficient, Fair Interpolation using Catmull-Clark Surfaces," Computer Graphics (SIGGRAPH Proceedings), pp. 35-44, 1993.

(Continued)

*Primary Examiner*—Ulka Chauhan
*Assistant Examiner*—Roberta Prendergast
(74) *Attorney, Agent, or Firm*—Patterson & Sheridan, LLP

(57) ABSTRACT

Method and apparatus for neighbor and edge indexing is described. A vertex is identified and assigned a reference. One-ring neighbor vertices of the vertex are identified. The reference is assigned to each of the one-ring neighbor vertices identified. An index to one of the one-ring neighbor vertices is assigned. The index is successively incremented to provide indices for each of the one-ring neighbor vertices remaining. Edge indexing follows as described above, with the vertex and its one-ring neighbors defining end points of edges. Additionally, offset indexing is described, and may be used for a consistent order of computation.

19 Claims, 14 Drawing Sheets

OTHER PUBLICATIONS

Havemann, Sven, "Interactive Rendering of Catmull/Clark Surfaces with Crease Edges," Computer Graphics, TU Braunschweig, Feb. 2001.

King, Davis et al., "An Architecture for Interactive Tetrahedral Volume Rendering," HP Laboratories Palo Alto, HPL-2000-121 (R.3), Aug. 2, 2001.

Lindholm, et al., "A User-Programmable Vertex Engine," ACM SIGGRAPH 2001, pp. 149-158, Aug. 2001.

Moreton, Henry, "Watertight Tessellation using Forward Differencing," SIGGRAPH/EUROPGRAPHICS Workshop on Graphics Hardware, pp. 25-32, 2001.

* cited by examiner

NEIGHBOR AND EDGE INDEXING

CROSS-REFERENCE TO RELATED APPLICATION(S)

This application claims priority from commonly owned now abandoned provisional U.S. Patent Application No. 60/462,527 entitled "NEIGHBOR AND EDGE INDEXING," filed Apr. 10, 2003, having common inventors and assignee as this application, which is incorporated by reference as though fully set forth herein.

FIELD OF THE INVENTION

The invention generally relates to graphics processing and, more particularly, to vertex indexing.

BACKGROUND

Conventionally, graphics processing units (GPUs) have included a graphics pipeline with a vertex engine capable of processing a stream of vertices provided by an application. In a conventional GPU at least two main types of operations, namely, vertex processing and primitive processing, are performed. Vertex processing, may involve texture coordinate generation, lighting, transforming from one space to another, and the like, using a vertex engine within a GPU. Such a vertex engine may be programmed through an application programming interface (API). Primitive processing using a primitive engine within a GPU may involve primitive subdivision, face culling, clipping, and the like. In conventional GPUs primitive processing is fixed, i.e. not programmable.

By providing a programmable vertex engine, flexibility and functionality is enhanced. However, processing is limited to triangle strips, quad (quadrilateral) strips, and line strips with a limited number of vertices. It is desirable to provide a general purpose scheme to define vertices, including connectivity for a collection of primitives such as triangle meshes and quad meshes. Furthermore, it is desirable and useful to provide a primitive engine access to vertices of a primitive and optionally with access to vertices of neighboring primitives.

Accordingly, it would be both desirable and useful to provide vertex indexing to enhance vertex processing to facilitate increasing programmability of a vertex engine and provide a general purpose definition of vertices within one or more primitives.

SUMMARY

An aspect of the invention is a method for indexing for data input to a graphics program. Additionally, one or more aspects of the invention relate to edge neighbors and to offset indexing.

Various embodiments of a method of the invention include a method for indexing vertex data defining at least one primitive. The method includes assigning a unique reference to each vertex defining the at least one primitive, identifying one-ring neighbor vertices of each vertex, assigning the unique reference of each vertex to each of the one-ring neighbor vertices of each vertex, and assigning a unique neighbor index to each of the one of the one-ring neighbor vertices of each vertex.

Various embodiments of a method of the invention include a method for indexing for data input to a graphics program. The method includes identifying a vertex, assigning a reference to the vertex to define a first reference vertex, identifying one-ring neighbor vertices of the vertex, assigning the reference to each of the one-ring neighbor vertices identified, assigning a neighbor index to one of the one-ring neighbor vertices identified, successively incrementing the neighbor index to provide incremented neighbor indices for assignment to the one-ring neighbor vertices remaining, and sequentially assigning one of the incremented neighbor indices to each of the one-ring neighbor vertices remaining.

Various embodiments of a method of the invention include a method for packing vertex data stored in memory. The method includes specifying a unit size for vertex data corresponding to a vertex, specifying an offset used to locate data for vertex data corresponding to each vertex stored in the memory, and combining the offset and unit size with an index to determine an address for accessing vertex data corresponding to a vertex stored in the memory.

DETAILED DESCRIPTION

Vertex indexing, including indexing of vertex one-ring neighbors and edges may be used to enhance vertex processing by a vertex engine and provide a general purpose definition of vertices within one or more primitives. Vertex indexing is used in programming a programmable vertex engine using a vertex program and vertex indexing is also used in programming a programmable primitive engine using a primitive program. Vertices are provided to graphics program, e.g., vertex programs, primitive programs, and the like, for use by the graphics program processing vertex data or primitive data. The graphics program uses vertex indices to reference the vertices. Vertex indexing may be used for point primitives, line primitives, quad primitives, and the like.

Figure 1:
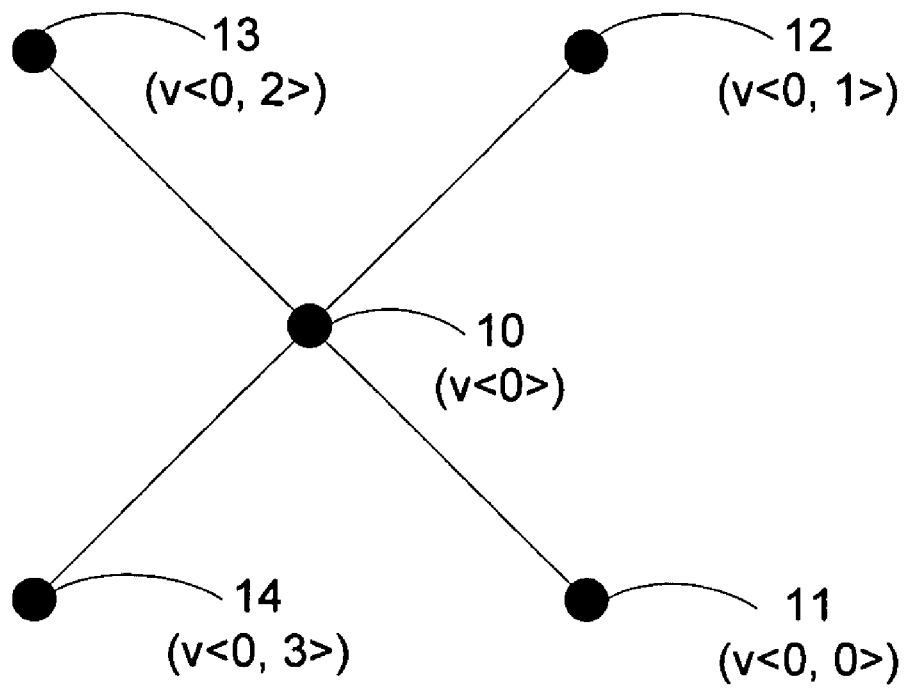
FIG. 1 depicts a point primitive diagram of an exemplary embodiment of a point primitive having neighboring point primitives for describing indexing of point primitives in accordance with one or more aspects of the invention.

FIG. 1 depicts a point primitive diagram of an exemplary embodiment of a point primitive 10 having neighboring point primitives 11, 12, 13, 14 ("11-14") for describing indexing of point primitives in accordance with one or more aspects of the invention. The nomenclature "v" is used to refer to a vertex. An identified vertex is indicated by v<i> where a reference, i, is an integer, the range of which is dependent on primitive type. For clarity, a starting value of zero for i is assumed, though other starting values for i may be used, such as one. Thus, in the example shown in FIG. 1, i is equal to 0. Neighbors of reference vertex v<i> are indicated as v<i, n> for n an integer, the range of which is dependent on the number of neighbors, as a neighbor index. For clarity, a starting value of zero for n is assumed, though other starting values for n may be used, such as one. In summary, an index of a reference vertex is the reference and an index of a neighbor vertex includes the reference and the neighbor index.

As described below, n is successively incremented for each vertex according to ordering of vertices, such as clockwise, counterclockwise or otherwise specified by a user/programmer/compiler ("user"). So, for example, point primitive neighbors 11-14 respectively are v<0, 0>, v<0, 1>, v<0, 2>, and v<0, 3>. In an embodiment of a vertex engine or a primitive engine neighbors 11-14 are accessed in the ordering specified by the user.

Neighboring point primitives 11-14 are termed "one-ring" neighbors of point primitive 10. Notably, neighboring point primitives (one-ring neighbors) 11-14 need not actually form a circular ring about point primitive 10, they merely are all neighbors with one-degree of separation from an originating vertex. The total number of neighbors, N, is equal to valence of a vertex. So, for example, valence of point primitive 10 is 4. Valence may be used to communicate a total number of neighbors to a vertex program.

Figure 2A:
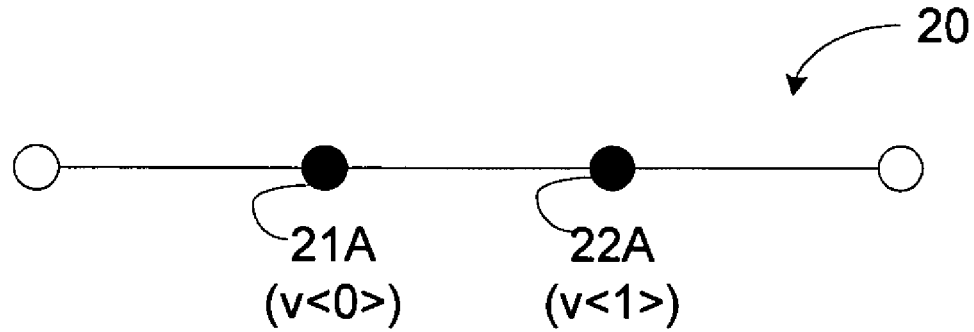
FIGS. 2A, 2B and 2C depict line primitive diagrams of an exemplary embodiment of a line primitive having neighboring vertices for describing indexing of line primitives in accordance with one or more aspects of the invention.
Figure 2B:
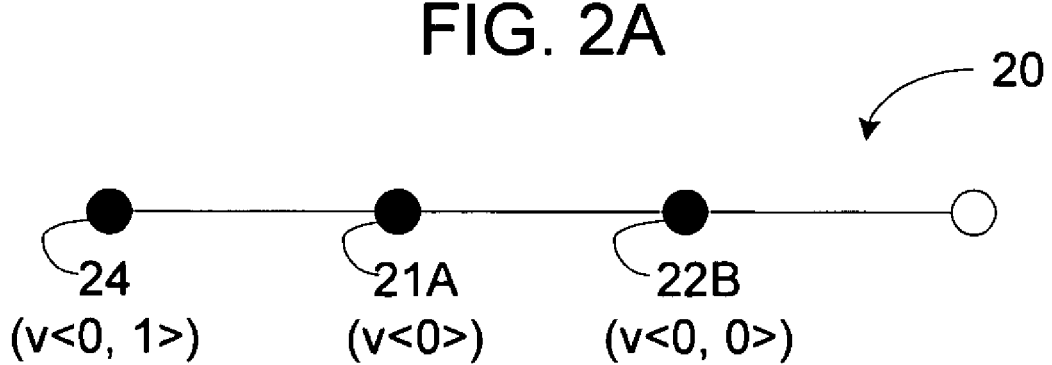
Figure 2C:
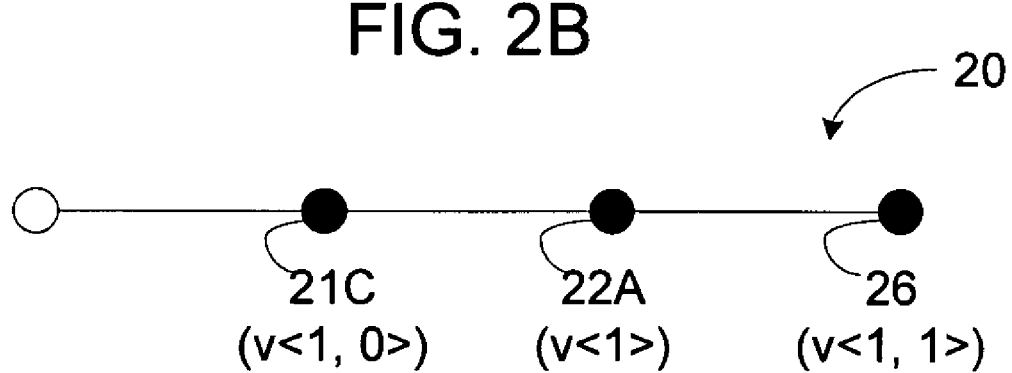

FIGS. 2A, 2B and 2C depict line primitive diagrams of an exemplary embodiment of a line primitive 20 having neighboring vertices for describing indexing of line primitives in accordance with one or more aspects of the invention. Notably, the term "line" as used herein refers to a two-vertex primitive, such as that formed by vertices 21A and 22A. The term line may be differentiated from an "edge", where the latter refers to edge data, which is not limited to line primitives. Examples of an edge include a border between two primitives, two patches, a border between two sub-patches, and a border between a patch and a sub-patch. A sub-patch may be formed in a subdivision process from a patch or a sub-patch.

As described above, integer i is an index to reference vertex of a primitive. Furthermore, as the number of reference vertices increases, i increases. Thus, line primitive 20 is defined by two vertices, vertices 21A and 22A, which may be indicated by v<0> and v<1>, respectively. Order of vertices 21A and 22A is as specified by a user. Each vertex 21A and 22A may have up to one additional neighbor for line primitive 20. Reference i, as applied to neighbors, is used to relate one or more neighboring vertices to a reference vertex. In FIG. 2B neighbors of vertex 21A—v<0>—are vertices 22B and 24, which are v<0, 0> and v<0, 1>, respectively. Notably, vertex 22A of FIG. 2A and vertex 22B of FIG. 2B are the same vertex, except the latter is indicated by v<0, n> for n an integer, which in this example is 0, for referring to the other vertex in line primitive 20.

In FIG. 2C neighbors of vertex 22A are vertices 21C and 26, which are indicated by v<1, 0> and v<1, 1>, respectively. Notably, vertex 21A of FIG. 2B and vertex 21C of FIG. 2C are the same vertex, except the latter is indicated by v<1, 0> referring to the other vertex in line primitive 20. Although vertices 21 and 22 may be accessed in one of two ways, namely, v<0> is equal to v<1, 0> and v<1> is equal to v<0, 0>, this redundancy need not exist in actual data storage. In other words, vertex data need only be stored in one location in memory that may be referenced for access in one or more ways. For example, in one embodiment a cross-reference table may be used to map vertex indices to memory addresses and each redundant vertex index maps to a memory address.

Figure 3:
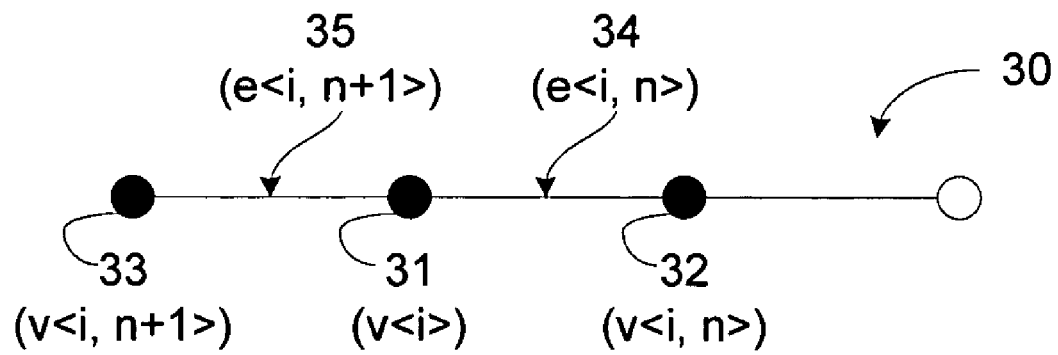
FIG. 3 depicts a line primitive diagram of an exemplary embodiment of a line primitive having neighboring vertices for describing indexing of neighbors and edges in accordance with one or more aspects of the invention.

It should be appreciated that vertex indexing for reference vertices and neighboring vertices has been described using integers i and n, as incremented, and a vertex designator, such as v. To further emphasize this vertex neighbor indexing scheme and to describe indexing of edges, FIG. 3 depicts a line primitive diagram of an exemplary embodiment of a line primitive 30 having neighboring vertices in accordance with one or more aspects of the invention. Vertex 31, v<i>, has neighboring vertices 32, v<i, n>, and 33, v<i, n+1>. Edges or edge data, as indicated with designator "e", 34 and 35 is indicated corresponding to a vertex neighbor. So, edge data 34 for an edge between vertices 31 and 32 is indicated as e<i, n>, and edge data 35 for an edge between vertices 31 and 33 is indicated as e<i, n+1>. Notably, line primitive 30 may be line primitive 20 of FIG. 2A. Redundancy of indexing edge data, as described herein, is for consistency, and is not to imply redundant data storage. Thus, edge data may be stored along with an associated neighbor vertex. So, for example, for a vertex v<i>, edge data n may be stored with neighbor vertex v<i, n>, and edge data n+1 may be stored with neighbor vertex v<i, n+1>. Alternatively, edge data may be separately stored from vertex data, especially for more complex primitives, where i and n are used as an edge index to access edge data stored separately from vertex data.

Figure 4A:
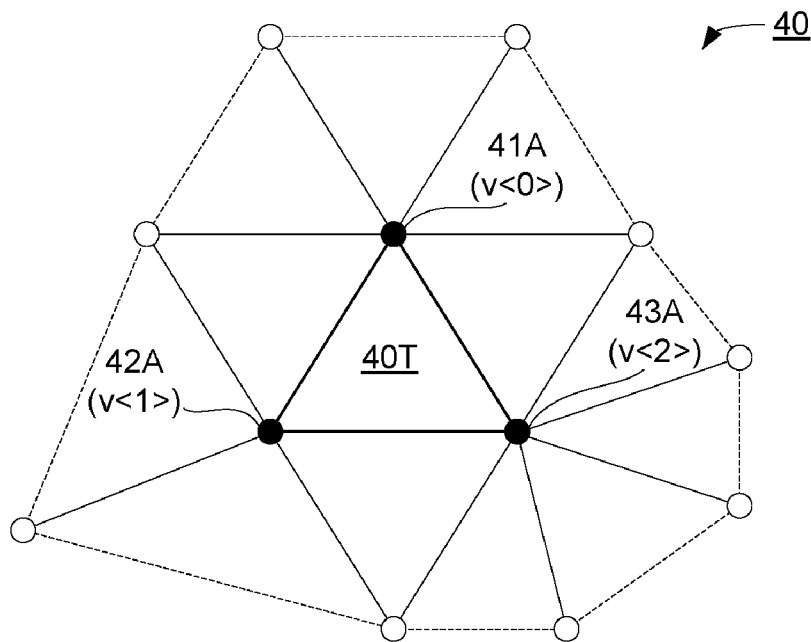
FIGS. 4A, 4B, 4C, 4D, and 4E depict triangle primitive diagrams of an exemplary embodiment of a triangle mesh for describing indexing of triangle primitives in accordance with one or more aspects of the invention.
Figure 4B:
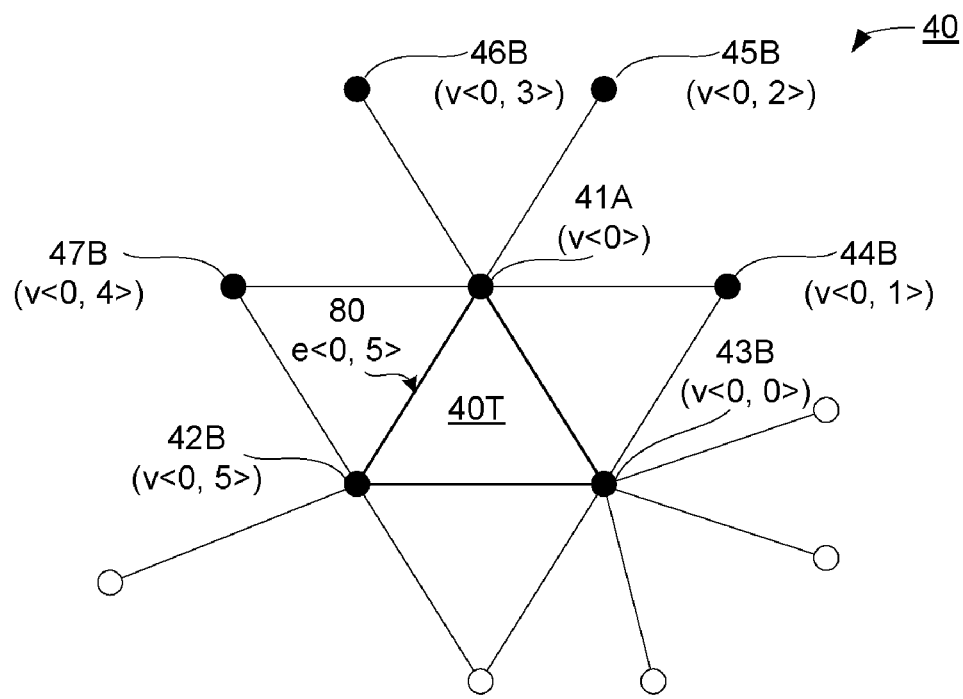
Figure 4C:
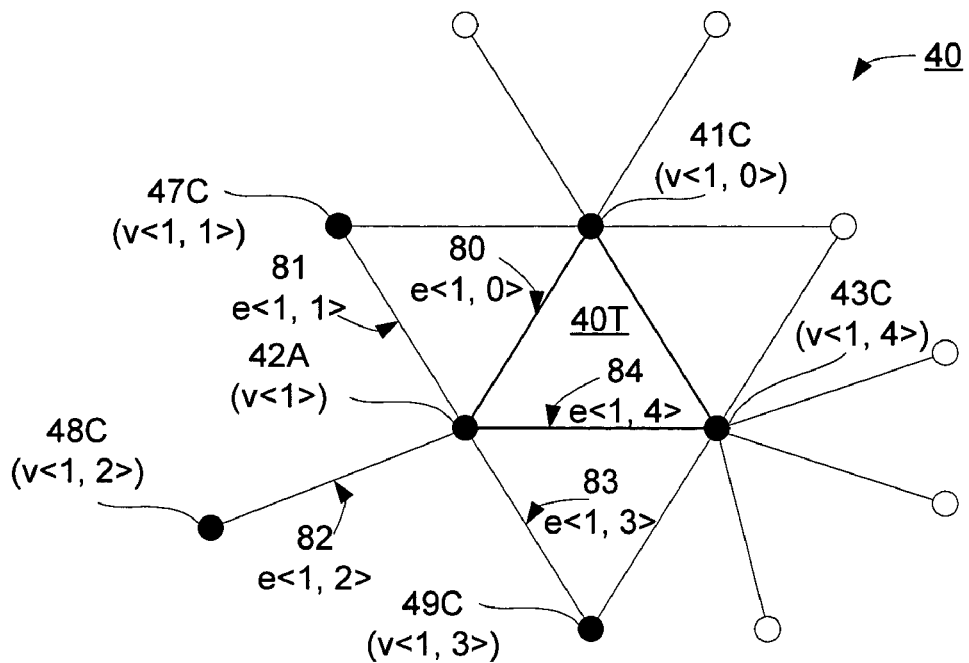
Figure 4D:
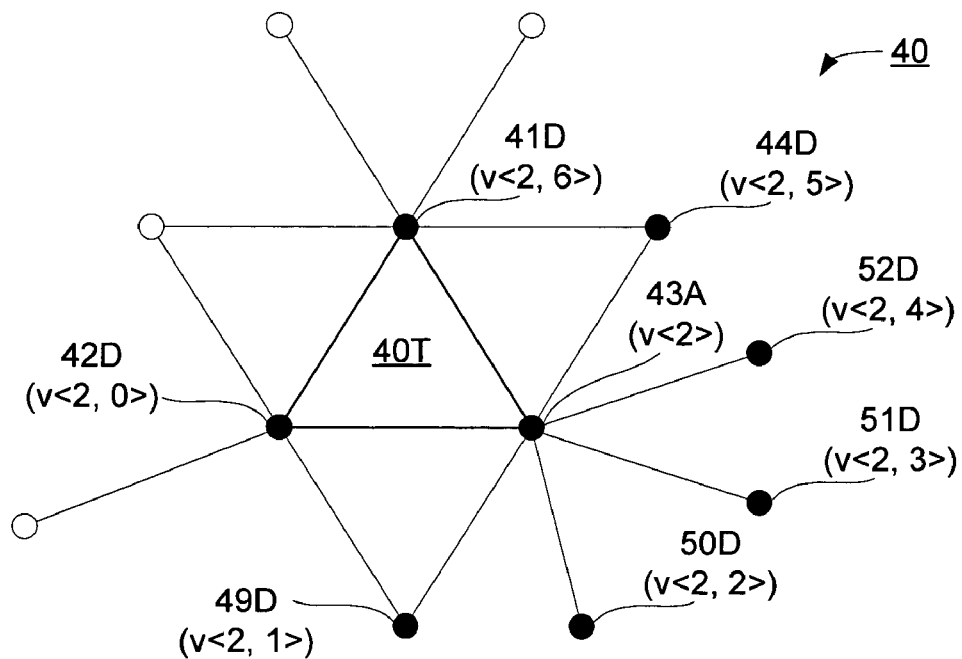

FIGS. 4A, 4B, 4C and 4D depict triangle primitive diagrams of an exemplary embodiment of indexing of triangle primitives such as triangles primitives within triangle mesh 40 in accordance with one or more aspects of the invention. For purposes of this description, it is assumed that triangle primitive 40T is a reference primitive for triangle mesh 40 for indexing. Triangle primitive 40T has three vertices, namely, vertices 41A, 42A and 43A, in a user specified order, such as v<0>, v<1> and v<2>, respectively. For purposes of clarity, counterclockwise ordering for indexing is described, though a user may specify another type of ordering for indexing. Neighbors 0 through N−1 of each vertex 41A, 42A and 43A of triangle primitive 40T are indexed counterclockwise around each such vertex, as depicted in FIGS. 4B, 4C and 4D, respectively.

Using counterclockwise indexing in FIG. 4B, one-ring neighbors for vertex 41A in sequence are: 43B, 44B, 45B, 46B, 47B and 42B, as indicated by v<0, 0>, v<0, 1>, v<0, 2>, v<0, 3>, v<0, 4> and v<0, 5>, respectively. Likewise, in FIG. 4C, one-ring neighbors for vertex 42A in sequence are: 41C, 47C, 48C, 49C and 43C, as indicated by v<1, 0>, v<1, 1>, v<1, 2>, v<1, 3> and v<1, 4>, respectively. Likewise, in FIG. 4D, one-ring neighbors for vertex 43A in sequence are: 42D, 49D, 50D, 51D, 52D, 44D and 41D, as indicated by v<2, 0>, v<2, 1>, v<2, 2>, v<2, 3>, v<2, 4>, v<2, 5> and v<2, 6>, respectively. For triangular domains, the number of one-ring neighbors for a vertex is the valence ("val") for that vertex. However, for quadrilaterals, the number of one-ring neighbors is not the valence, as described below. Stated more generally, valence of a vertex is the number of any and all vertices, if any, that share an edge with such a vertex. Thus, valence may be used along with a modulo of total number of neighbors to determine neighbor indices.

It should be appreciated that ordering direction is user specified. However, for a triangular domain, one primitive vertex is an index vertex, one other primitive vertex is a starting neighbor, and the remaining primitive vertex is an ending neighbor. For example, $$v<0>==v<1,0>==v<2,\text{val2}-1> \quad (1)$$

$$v<1>==v<2,0>==v<0,\text{val0}-1> \quad (2)$$

$$v<2>==v<0,0>==v<1,\text{val1}-1> \quad (3)$$

where val0, val1 and val2 are valences for vertices 41A, 42A and 43A, respectively. Notably, for n equal to zero, one is subtracted from total number of neighbors N for a last vertex neighbor index. In the examples of FIGS. 4B, 4C and 4D, val0, val1 and val2 respectively are 6, 5 and 7. Again, this redundancy for purposes of describing indexing does not mean actual data storage needs to be redundant.

Figure 4E:
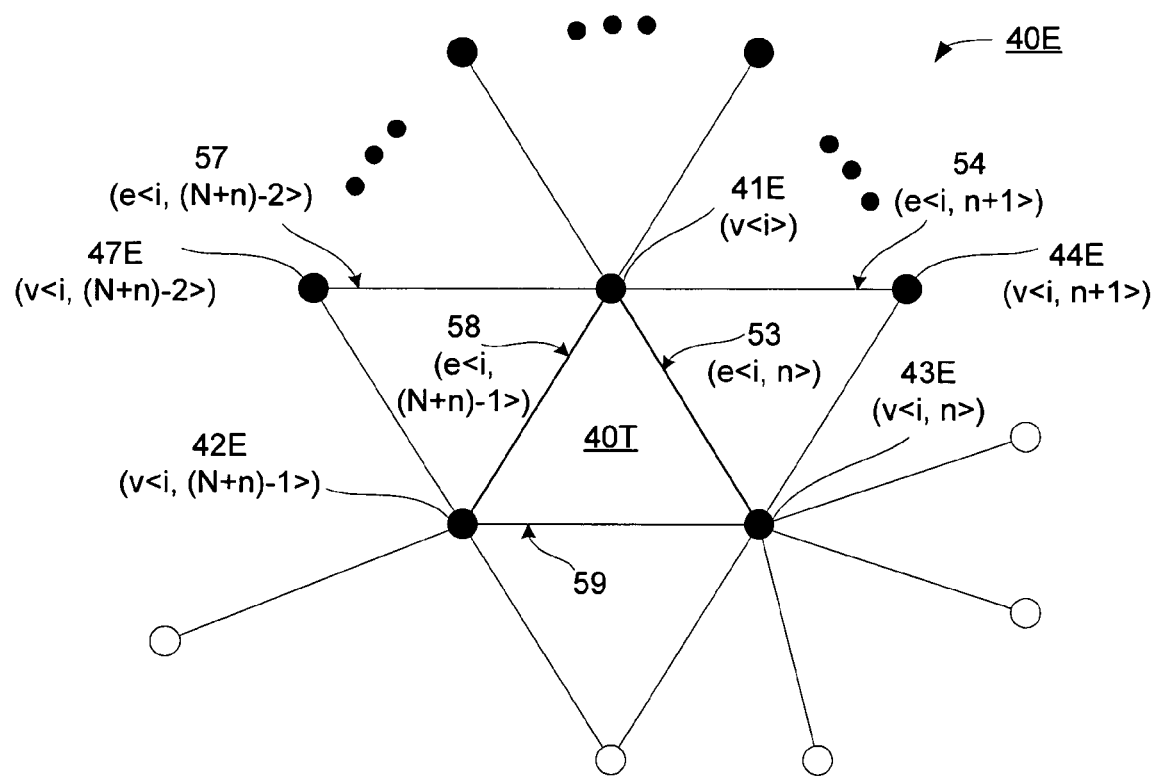

FIG. 4E depicts a triangle primitive diagram of the exemplary embodiment of triangle mesh 40E, such as an extension of that of FIG. 4B, having optional edge data, in accordance with one or more other aspects of the invention. Triangle primitive 40T has three vertices, 41E, 42E and 43E, which are respectively more generally designated as v<i>, v<i, (N+n)−1> and v<i, n>. Edge data follows vertex neighbor, for example: edge data 53, e<i, n>, follows vertex 43E, namely v<i, n>; edge data 54, e<i, n+1>, follows vertex 44E, namely, v<i, n+1>; so on and so forth until edge data 57, e<i, (N+n)−2> follows vertex 47E, namely, v<i, (N+n)−2>; and edge data 58, e<i, (N+n)−1> follows vertex 42E, namely v<i, (N+n)−1>. Thus, an edge is referenced in relation to a vertex and a neighbor of such vertex associated with such an edge.

For triangle mesh 40E, edge data of a reference triangular primitive, such as edge data for edges 53, 58 and 59, may be referenced in one of two ways, for example, by indexing based on the vertex for each "endpoint" of an edge. For example, in FIG. 4B edge 80 equals e<0,5>, and in FIG. 4C edge 80 equals e<1,0>. Again, this redundancy for purposes of describing indexing does not mean actual data storage needs to be redundant.

FIGS. 5A, 5B, 5C and 5D depict four-sided polygon or quadrilateral primitive diagrams of an exemplary embodiment of indexing of quadrilateral primitives, such as quadrilateral primitives within a quadrilateral mesh 60 in accordance with one or more aspects of the invention. For purposes of describing indexing, quadrilateral primitive 60Q is assumed to be a reference quadrilateral primitive of quadrilateral mesh 60. Quadrilateral primitive 60Q has vertices 61A, 62A, 63A and 64A, which are indicated as v<0>, v<1>, v<2> and v<3>, respectively. To expound upon the above examples, each additional quadrilateral primitive adjacent to a vertex of quadrilateral primitive 60Q is identified, as each vertex of quadrilateral primitive 60Q is used as a reference vertex.

Figure 5A:
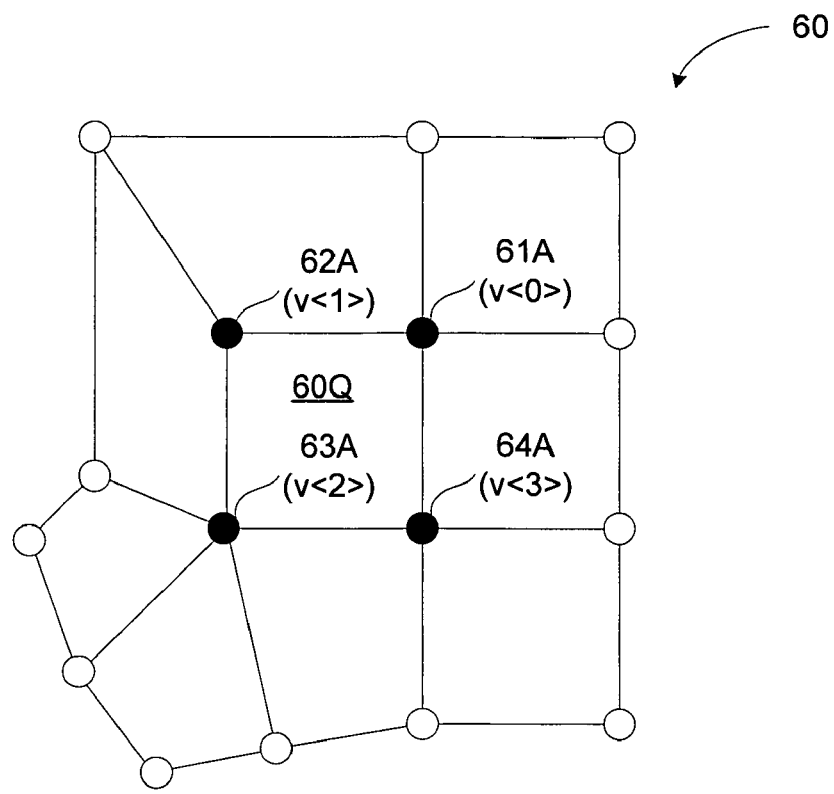
FIGS. 5A, 5B, 5C, 5D, 5E, and 5F depict or quadrilateral primitive diagrams of an exemplary embodiment of a quadrilateral mesh for describing indexing of quadrilateral primitives in accordance with one or more aspects of the invention.
Figure 5B:
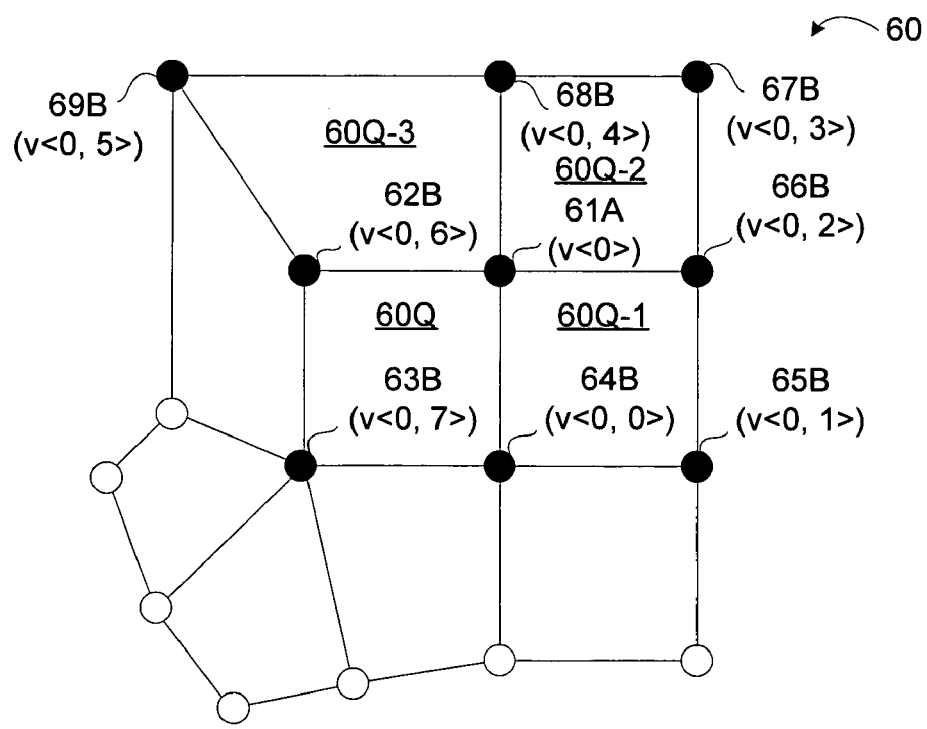

Referring to FIG. 5B, using vertex 61A as reference vertex v<0>, neighboring quadrilaterals 60Q-1, 60Q-2 and 60Q-3 to quadrilateral primitive 60Q are identified. An ending vertex, namely, vertex 63B in this example, diagonally across quadrilateral primitive 60Q relative to reference vertex 61A is selected. Continuing the above assumed conventions of counterclockwise ordering of neighbors from 0 to N−1, a starting vertex, such as 64B v<3>, is selected. Sequence of vertices 64B, 65B, 66B, 67B, 68B, 69B, 62B and 63B is v<0, 0>, v<0, 1>, v<0, 2>, v<0, 3>, v<0, 4>, v<0, 5>, v<0, 6> and v<0, 7>, respectively. Order of v<0>, v<1>, v<2> and v<3> of quadrilateral primitive 60Q is user specified. Notably, vertices 64B, 65B, 66B, 67B, 68B, 69B, 62B and 63B are one-ring neighbors of vertex 61A.

Figure 5C:
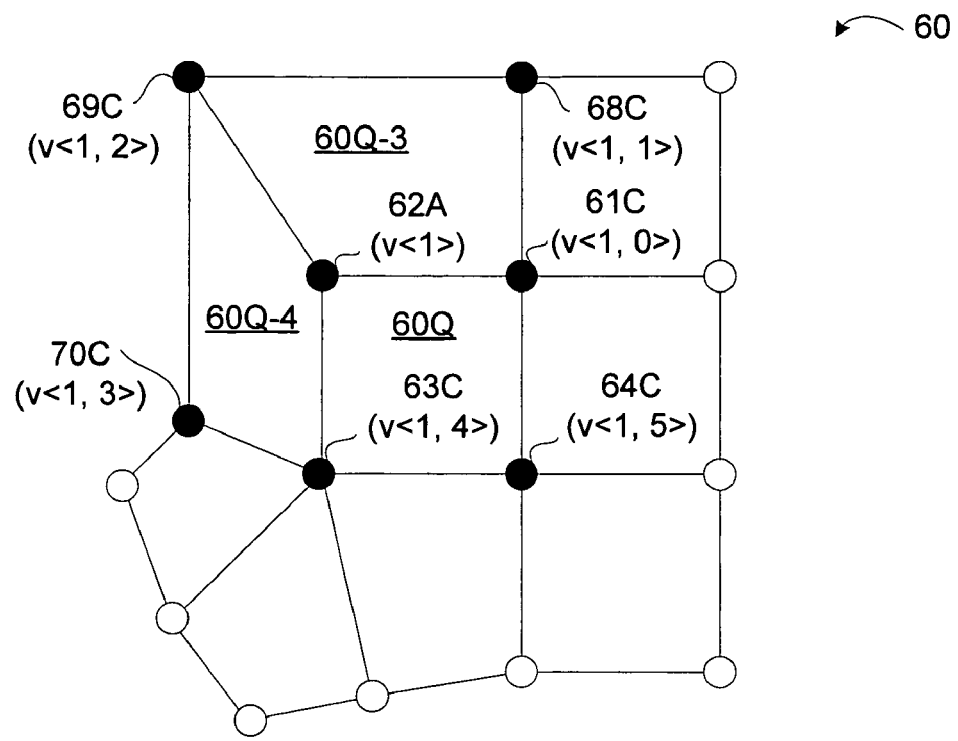

Referring to FIG. 5C, using vertex 62A as a reference vertex v<1>, neighboring quadrilaterals 60Q-3 and 60Q-4 to quadrilateral primitive 60Q are identified.

Continuing the above assumed conventions of counterclockwise ordering of neighbors from 0 to N−1, an ending vertex is selected from an originating primitive, such as quadrilateral primitive 60Q. The ending vertex, namely, vertex 64C in this example, is diagonally across from the reference vertex. A starting vertex that is adjacent to the ending vertex in the counterclockwise direction, such as 61C is selected. Sequence of vertices 61C, 68C, 69C, 70C, 63C and 64C is v<1, 0>, v<1, 1>, v<1, 2>, v<1, 3>, v<1, 4> and v<1, 5>, respectively. Notably, vertices 61C, 68C, 69C, 70C, 63C and 64C are one-ring neighbors of vertex 62A.

Figure 5D:
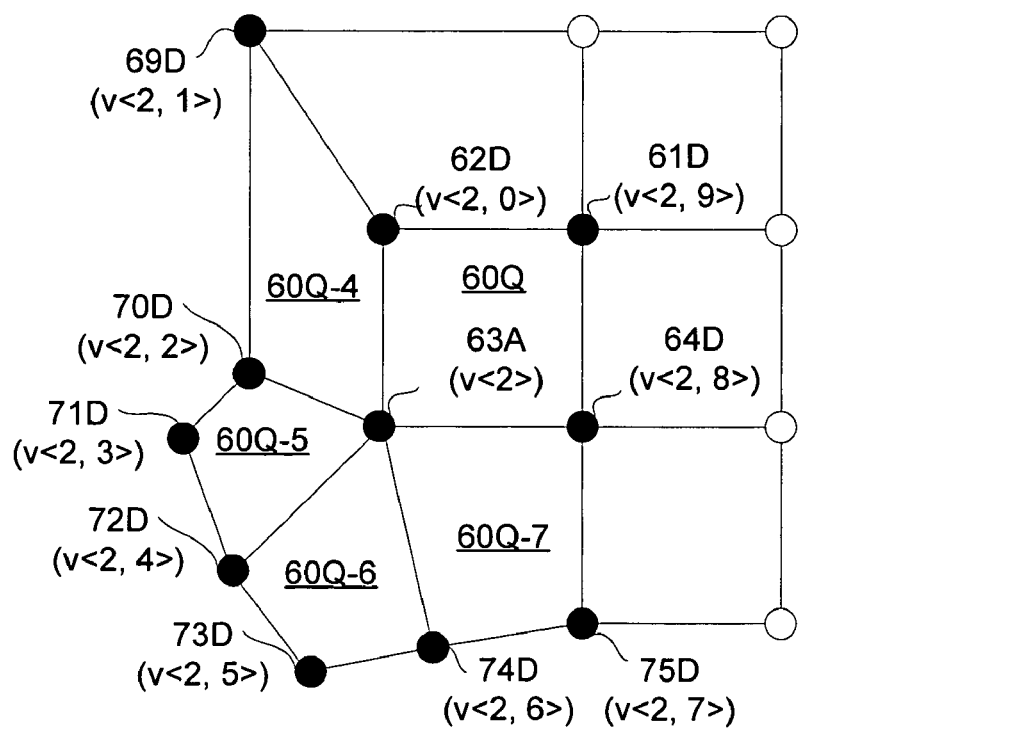

Referring to FIG. 5D, using vertex 63A as a reference vertex v<2>, neighboring quadrilaterals 60Q-4, 60Q-5, 60Q-6 and 60Q-7 to quadrilateral primitive 60Q are identified. A vertex of an originating primitive, such as quadrilateral primitive 60Q, diagonally across from the reference vertex is selected as an ending vertex, namely, vertex 61D in this example. Continuing the above assumed conventions of counterclockwise ordering of neighbors from 0 to N−1, a vertex adjacent to vertex 61D, such as vertex 62D, is selected as the starting vertex. Sequence of vertices 62D, 69D, 70D, 71D, 72D, 73D, 74D, 75D, 64D and 61D is v<2, 0>, v<2, 1>, v<2, 2>, v<2, 3>, v<2, 4>, v<2, 5>, v<2, 6>, v<2, 7>, v<2, 8> and v<2, 9>, respectively. Notably, vertices 62D, 69D, 70D, 71D, 72D, 73D, 74D, 75D, 64D and 61D are one-ring neighbors of vertex 63A.

Figure 5E:
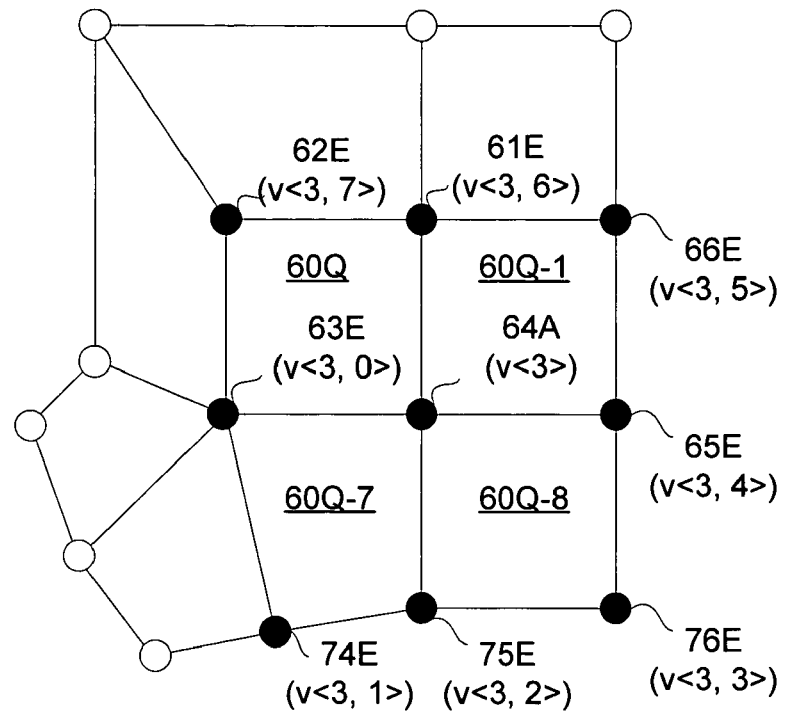

Referring to FIG. 5E, using vertex 64A as a reference vertex v<3>, neighboring quadrilaterals 60Q-7, 60Q-8 and 60Q-1 to quadrilateral primitive 60Q are identified. A vertex of an originating quadrilateral primitive, such as quadrilateral primitive 60Q, which is diagonally across from the reference vertex is selected as an ending vertex, namely, vertex 62E in this example. Continuing the above assumed conventions of counterclockwise ordering of neighbors from 0 to N−1, a starting vertex, such as 63E, is selected. Sequence of vertices 63E, 74E, 75E, 76E, 65E, 66E, 61E and 62E is v<3, 0>, v<3, 1>, v<3, 2>, v<3, 3>, v<3, 4>, v<3, 5>, v<3, 6> and v<3, 7>, respectively. Notably, vertices 63E, 74E, 75E, 76E, 65E, 66E, 61E and 62E are one-ring neighbors of vertex 64A.

With respect to the above examples in FIGS. 5A-5E, it should be apparent that a vertex may be accessed with more than one index. These indices are thus redundant for purposes of indexing, but this does not mean that actual data storage of such indices is or even needs to be redundant. Furthermore, it should be appreciated that indexing of entire neighboring quadrilaterals may be redundant, and again this does not mean that actual data storage of such quadrilaterals is or even needs to be redundant. Examples of multiple indices to access vertices 61A, 62A, 63A and 64A are respectively:

$$v<0>==v<1,0>==v<2,2*val2-1>==v<3,2*val3-2> \quad (4)$$

$$v<1>==v<2,0>==v<3,2*val3-1>==v<0,2*val0-2> \quad (5)$$

$$v<2>==v<3,0>==v<0,2*val0-1>==v<1,2*val-2> \quad (6)$$

$$v<3>==v<0,0>==v<1,2*val1-1>==v<2,2*val2-2> \quad (7)$$

where val0, val1, val2 and val3 are valences for vertices 61A, 62A, 63A, and 64A, respectively. Notably, for quadrilateral domains, the number of neighbors around a selected vertex is equal to twice the valence of that vertex selected. So, for example, in FIG. 5C, valence of vertex 62A is three for vertices 61C, 69C and 63C, as each of those vertices share an edge with vertex 62A. However, the number of one-ring neighbors of vertex 62A is six, as described above. Furthermore, it should be noted that for the above-described indexing starting at n equal to zero, even-number indices, n, refer to neighboring vertices that share an edge with a selected reference vertex, and odd-numbered indices, n, refer to neighboring vertices that are diagonally across a face of a quadrilateral from such a selected reference vertex. This numbering pattern may be reversed for a starting value of n equal to 1.

Figure 5F:
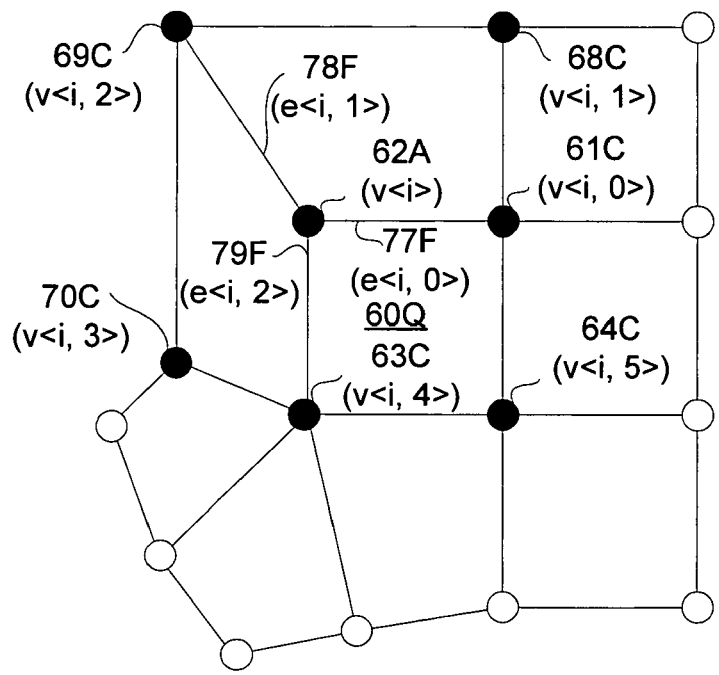

FIG. 5F depicts a quadrilateral primitive diagram of the exemplary embodiment of neighbor and edge indexing for a quadrilateral primitive such as quadrilateral primitive 60Q within quadrilateral mesh 60 of FIG. 5C, having optional edge data in accordance with one or more other aspects of the invention. Edge data is indicated for edges 77F, 78F and 79F adjacent to or shared by selected vertex 62A, for i a user selected reference. Notably, only edges adjacent to or shared by a vertex of quadrilateral 60Q being indexed may have edge data. Edges are referenced in relation to a selected vertex of an originating quadrilateral primitive and one neighbor of such a selected vertex, or more particularly for that shown in FIG. 5F an even neighbor, n, of such a selected vertex. With respect to a neighbor index, edge data index with respect to a neighbor is neighbor index divide by two. For example, edges 77F, 78F and 79F are indexed as e<i, 0>, e<i, 1> and e<i, 2>, respectively, which is from dividing neighbor indices of vertices 61C, 69C and 63C for v<i, 0/2>, v<i, 2/2> and v<i, 4/2>. Edge neighbor index division is optional; however, indexing is more consistent as described above with such division.

Notably, when each of vertices 61A through 64A of FIG. 5A is processed, each edge of quadrilateral primitive 60Q will have two separate indices. This redundant indexing does not imply redundancy in actual data storage of edge data. Rather, it indicates that more than one reference may be used to access the same edge data.

Vertices with neighboring vertices are used in subdivision programs for refining control points and calculating limit points. Vertices with neighboring vertices are different from point primitives in at least two respects: a vertex can have edge data, and the number of neighboring vertices depends on mesh type. For example, a vertex in a triangular mesh has a number of neighbors equal to the valance of the vertex. A vertex in a quadrilateral mesh has a number of neighbors equal to twice the valance of the vertex.

Referring again to FIG. 4C, suppose that vertex 42A is a reference vertex provided as input to or generated as output of a triangle subdivision program. Edge data for vertex 42A may be indexed for edges 80, 81, 82, 83 and 84 as e<1, 0>, e<1, 1>, e<1, 2>, e<1, 3> and e<1, 4>, respectively, according to vertex 42A and neighboring vertices of 41C, 47C, 48C, 49C and 43C, respectively.

Referring again FIG. 5F, suppose that vertex 62A is a reference vertex provided as input to or generated as output of a quadrilateral subdivision program. Edge data for edges 77F, 78F and 79F may be indexed as previously described.

It should be appreciated that while lines are second order primitives, edges are not. As previously mentioned, edges may be a border between patches, sub-patches or a combination of both as a result of subdivision. Edges may be generated as input to one or more subdivision programs, such as an edge split test.

The above described indexing was absolute indexing. However, to ensure consistency in numerical calculations, it is desirable to be able to access neighboring vertices in the same order during primitive processing, for example when a vertex is accessed multiple times from one or more adjacent or connected patches. When vertices within a primitive are accessed in a consistent order during primitive processing computed values are deterministic even when computed at different points in time in separate API calls. With respect to vertices and edges, consistency may be provided by applying a user-defined offset to neighbor indices to specify a consistent order of calculation, i.e. using user offset indexing as described further herein. Failure to maintain a consistent order during primitive processing may result in the introduction of geometry artifacts such as cracks between primitives and missing pixels.

Order of vertices of one-ring neighbors, specified by neighbor indices is not necessarily consistent for primitives sharing vertices, unless an offset is added to each neighbor index. In other words, without an offset, one-ring neighbors may not be processed, for example be summed, in the same order, resulting in inconsistencies between identical computations performed at different points in time. However, by adding offset to neighbor index n, consistent ordering of summation of one-ring neighbors may be ensured.

Figure 6A:
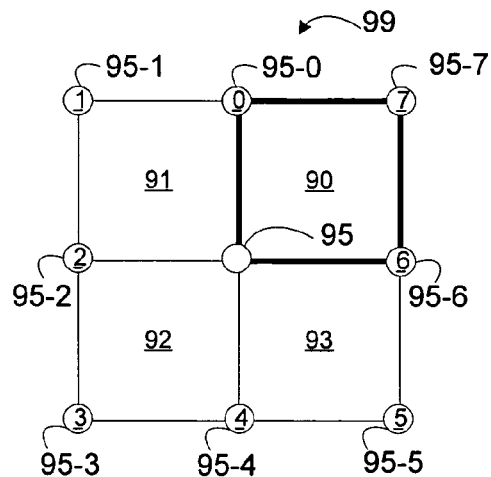
FIGS. 6A, 6B. 6C and 6D, depict four views of a quadrilateral mesh with absolute indexing as described with respect to FIGS. 5A, 5B, 5C and 5D.
Figure 6B:
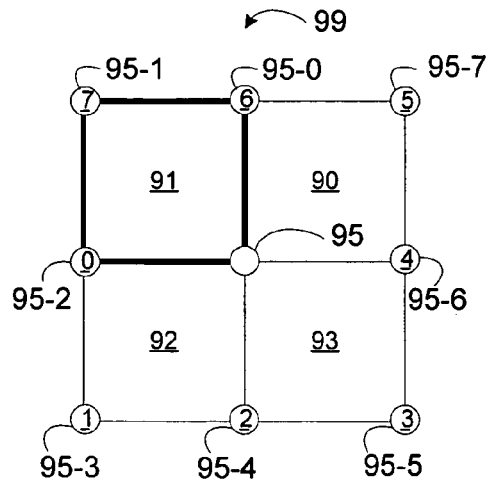

For example, in FIGS. 6A, 6B, 6C, and 6D, there are shown four views of a quadrilateral mesh 99 with absolute indexing such as described with respect to FIGS. 5A-5E. Each vertex is labeled 0 through 7 in order. Depending on which quadrilateral 90, 91, 92 or 93 is selected for an indexing vertex 95, neighboring vertices will be summed accordingly. So, if quadrilateral 90 is selected, vertex 95-7 is an ending vertex and vertices are summed in order of 95-0, -1, -2, -3, -4, -5, -6, -7. However, if quadrilateral 91 in FIG. 6B is selected, vertices are summed in the order of 95-2, -3, -4, -5, -6, -7, -0, -1. If quadrilateral 92 is selected in FIG. 6C, vertices are summed in the order of 95-4, -5, -6, -7, -0, -1, -2, -3. If quadrilateral 93 is selected in FIG. 6D, vertices are summed in the order of 95-6, -7, -0, -1, -2, -3, -4, -5. In short, there are four possible orders of summation, and hence inconsistency in calculation order can be avoided when user offset indexing, as described further herein, is used instead of absolute indexing.

Figure 6C:
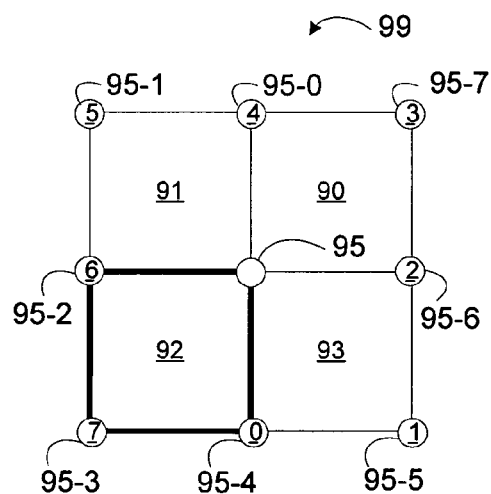
Figure 6D:
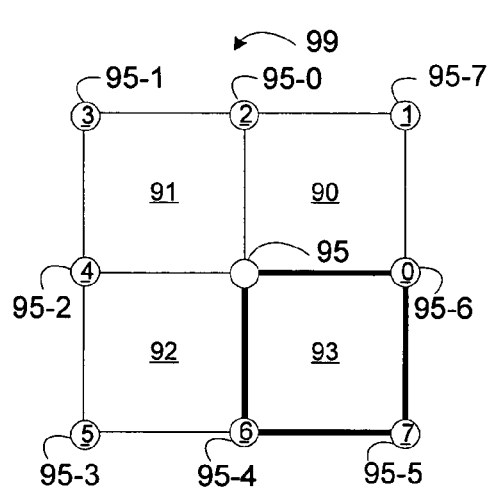

Assuming ordering as when quadrilateral 90 is a starting quadrilateral, i.e., zero offset, offset when quadrilateral 91 is selected is 2, and offsets when quadrilaterals 92 and 93 are selected are 4 and 6, respectively. In other words, each new vertex included increments an offset, and total new vertices included for a primitive provide a total offset, o, for such primitive. For example, quadrilateral 91 includes vertex 95-1 and vertex 95-2, incrementing a total offset by 2. This offset total is added to each neighbor index for an associated primitive, and a modulo of total number of one-ring neighbors of a selected vertex is applied to such neighbor index to ensure proper ordering for consistency in calculation. Thus, for example, for each neighbor index value 0 though 7, an offset of: 2 is added in FIG. 6B; 4 is added in FIG. 6C and 6 is added in FIG. 6D. Valence of vertex 95 is 4, so there are twice as many one-ring neighbors for vertex 95, specifically 8 one-ring neighbors. So modulo 8 is applied to each neighbor index after adding offset o, or v<i, modulo (total number of one-ring neighbors)[n+o]>. Table I provides respective results for quadrilaterals 91, 92 and 93, with respect to re-ordering of vertices by determining a new neighbor index using offset indexing.

TABLE I

| Neighbor Index Plus Offset 2, n + o | New Neighbor Index, Modulo(8) | Neighbor Index Plus Offset 4, n + o | New Neighbor Index, Modulo(8) | Neighbor Index Plus Offset 6, n + o | New Neighbor Index, Modulo(8) |
|---|---|---|---|---|---|
| 0 + 2 | 2 | 0 + 4 | 4 | 0 + 6 | 6 |
| 1 + 2 | 3 | 1 + 4 | 5 | 1 + 6 | 7 |
| 2 + 2 | 4 | 2 + 4 | 6 | 2 + 6 | 0 |
| 3 + 2 | 5 | 3 + 4 | 7 | 3 + 6 | 1 |
| 4 + 2 | 6 | 4 + 4 | 0 | 4 + 6 | 2 |
| 5 + 2 | 7 | 5 + 4 | 1 | 5 + 6 | 3 |
| 6 + 2 | 0 | 6 + 4 | 2 | 6 + 6 | 4 |
| 7 + 2 | 1 | 7 + 4 | 3 | 7 + 6 | 5 |

Using these new neighbor indices when quadrilateral 91 in FIG. 6B is selected an offset of 2 is applied to the index of vertex 95-0, resulting in an index of 6+2 and the neighbor index, modulo 8 for vertex 95-0 is 0 (8 modulo 8). In FIG. 6B the neighbor vertices of vertex 95 an offset of 2 is applied to the indices of the neighbor vertices specifying a calculation order of 95-0, 95-1, 95-2, 95-3, 95-4, 95-5, 95-6, and 95-7. Likewise, when quadrilateral 92 is selected in FIG. 6C, the neighbor vertices of vertex 95 an offset of 4 is applied to the indices of the neighbor vertices specifying the same calculation order of 95-0, 95-1, 95-2, 95-3, 95-4, 95-5, 95-6, and 95-7. Likewise, when quadrilateral 92 is selected in FIG. 6D, the neighbor vertices of vertex 95 an offset of 6 is applied to the indices of the neighbor vertices specifying the same calculation order of 95-0, 95-1, 95-2, 95-3, 95-4, 95-5, 95-6, and 95-7. Thus, offset facilitates a user to perform more consistent calculation by specifying calculation order using offset indexing. More generally, for a mesh of quadrilaterals, user specified offset should increase by 2 for each quadrilateral around a vertex, and, for a mesh of triangles, user specified offset should increase by 1 for each triangle around a vertex. Notably, any primitive may be selected as a starting primitive, namely, one in which a vertex has an offset of zero. For edges and sub-patches generated during recursive subdivision, offsets are generated by a graphics processing unit.

Indexing, as described above, provides clarity for correspondence between neighbors and associated edges. For triangular topologies such as triangle primitives including edges, corresponding neighbors and edges have the same index relative to a vertex. For quadrilateral topologies such as quadrilateral primitives, including edges, indices of edges are ½ the index of their neighbors as associated with a vertex. Additionally, though positive indices have been described, negative indices equally apply. Negative indices may use modulo of their neighbors as well.

Assuming patches and their one-ring neighbors are a subset of a mesh, certain topological constraints on triangular primitives may be identified, as well as general rules. For example, as a general rule, size of a neighbor list for a triangular primitive is equal to nine less the sum of valences for vertices of such a triangular primitive. There is one exception to this general rule for triangular primitives, if all three vertices have valence three, then there is only one vertex in the one-ring neighborhood of this triangular primitive, i.e., a triangular primitive is a face of a tetrahedron. There is one other exception to the above general rule, which will not be drawn and an API should preclude it being specified, namely, two vertices of valence three and one vertex of valence four.

Quadrilateral meshes do not have the above-identified topological constraints. Thus, a general rule for quadrilateral meshes is that size of a neighbor list for a quadrilateral primitive is equal to sixteen less twice the sum of valences of vertices of such a quadrilateral primitive.

Figure 7:
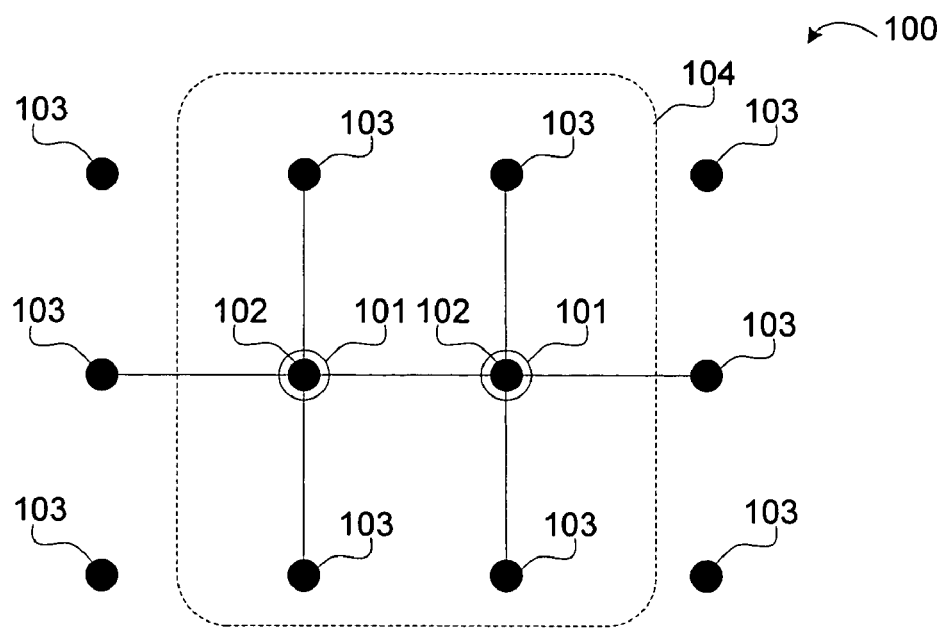
FIG. 7 is a vertex diagram of an exemplary embodiment of edge test program input data in accordance with one or more aspects of the invention.
Figure 8:
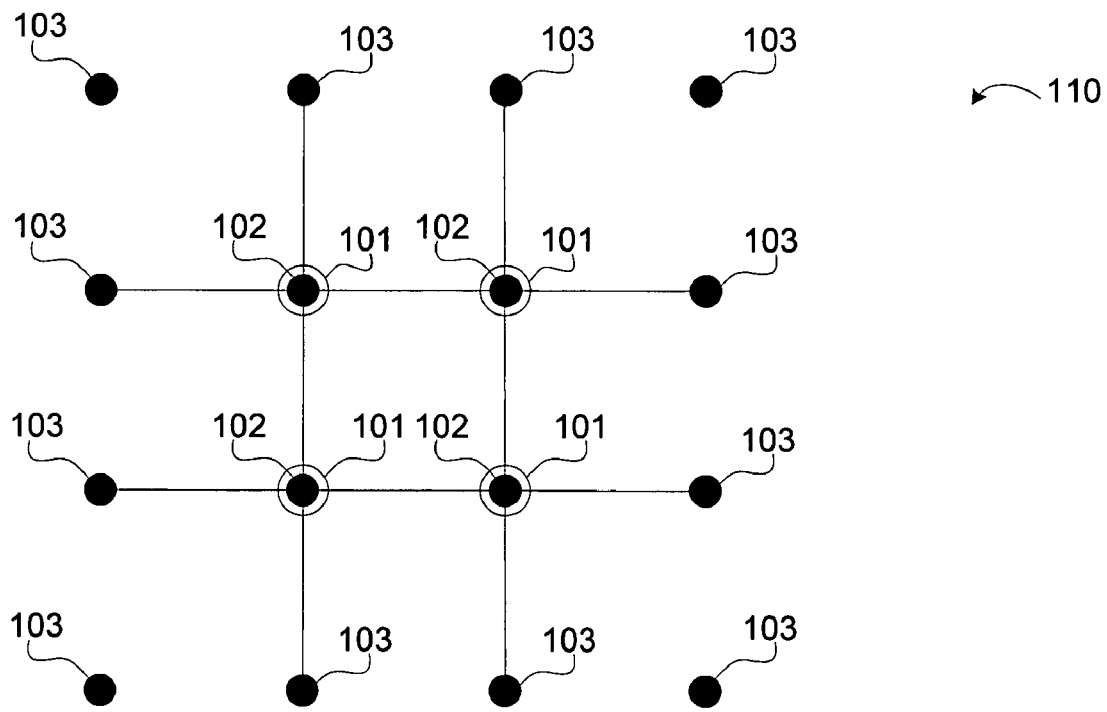
FIG. 8 is a vertex diagram of an exemplary embodiment of face control point program input in accordance with one or more aspects of the invention.

Various subdivision programs operate on different types of data, such as vertices, edges and faces. FIGS. 7 and 8 are vertex diagrams of respective exemplary embodiments of edge test program input data 100 and face control point program input data 110 in accordance with one or more aspects of the invention. Though FIGS. 7 and 8 are for quadrilateral topology, other topologies, such as triangular topology, may be used as will become apparent. Furthermore, it will be apparent that a configurable state machine may be constructed to provide input to a subdivision program.

Data that may be input to a subdivision edge program, such as data 100 shown in FIG. 7, may include two control points 102 at ends of an edge, one-ring neighbors 103 of such control points 102, and two limit points 101 at ends of such an edge. Subsets of data 100 may be used as program input to a subdivision edge program. Examples of such subsets are: control points 102 and neighbors 103, control and limit points 102, 101 and neighbors 103 within box 104 for subdivision, control points 102 and neighbors 103 within box 104 for subdivision, control and limit points 102, 101, control points 102, and limit points 101.

A user may desire to use limit points 101 to perform screen-space subdivision. If normal vectors have been calculated for limit points 101, then control points 102 and limit points 101 may be sufficient for screen-space subdivision. Thus, use of neighbors 103 for input data to an edge test program is optional.

Data that may be input to a face control point program, such as data 110, may include four control points 102 at corners of a quadrilateral, one-ring neighbors 103 of such control points 102 or a portion of one-ring neighbors 103, and four limit points 101 at corners of such a quadrilateral. Subsets of data 110 may be used as program input to a face control point program. Examples of such subsets are: control points 102 and neighbors 103, control and limit points 102, 101, control points 102, and limit points 101. For example, for Catmull-Clark subdivision, four control points 102 are sufficient data input for a face control point program.

Notably, though a user may use complete sets of data 100 and 110, this may lead to more computation than used to perform a particular subdivision application, such as Loop or Catmull-Clark subdivision for example. Thus, rather than having a subdivision state machine configured to compute all points, a state machine that is configurable to compute subsets of data may be more efficient.

To enhance computational efficiency, packing of edge data and control points within bytes or within one or more memory locations may be used. By storing calculated control points in memory, such as vertex random access memory (RAM), recomputation of control points can be reduced, and stored control points may be read from vertex RAM during recursive subdivision.

A control point may include a varying number of attributes. For example a control point may have only a single attribute, e.g., position coordinates. Additional attributes may be interpolated from patch parameters (s,t) after a limit point is computed. A control point may also have two attributes, position coordinates and texture coordinates. The texture coordinates may be interpolated to compute additional attributes. A subdivision program, such as a subdivision program producing triangular primitives may necessitate storing as many as 78 control points for efficient triangular subdivision, and a subdivision program producing quadrilateral primitives may necessitate storing more than 78 control points for efficient quadrilateral subdivision. Furthermore, limit points may be computed and stored in vertex RAM for one or more vertices. Thus, several control points, limit points, and edge data may be packed into each vertex stored in vertex RAM.

By constraining control points, limit points, and edge data to unit sizes that are a power of two, there are various possible ways to access packed vertex data such as a control point, a limit point, or edge data. Table II lists examples of packing.

TABLE II

| Bits | Size | Offset |
|---|---|---|
| # # # # 1 | 1 | # # # # (0, 1, 2, . . . or 15) |
| # # # 1 0 | 2 | # # # 0 (0, 2, 4, . . . or 14) |
| # # 1 0 0 | 4 | # # 0 0 (0, 4, 8, or 12) |
| # 1 0 0 0 | 8 | # 0 0 0 (0 or 8) |
| 1 0 0 0 0 | 16 | 0 (full-size vertex) |
| 0 0 0 0 0 |  | treat same as 1 0 0 0 0 |

A state machine may be configured to manage packing and accessing packed vertex data. The leftmost column of Table II specifies a bit field for a packing value, where each # represents a bit. A packing value may be specified for portions of vertex data, such as control points, limit points, or edge data. A control point with a packing value of 00001 has size of 1, where the size unit may be a number of bits, such as 8 bits, 16 bits 32 bits, or a number of bits greater than 32. The control point may be referenced as an entry in vertex RAM using an offset and the size, where the offset is combined with an address (or index) for the vertex. For example, the offset may be added to an index of a vertex to locate the packed vertex data within a vertex RAM, and the size may be used to identify out-of-range accesses. Maximum sizes of control points, limit points, and edge data may be set by a user, or a driver or compiler after analysis of subdivision programs.

A primitive extension defines the connectivity and vertices used to specify a collection of connected primitives, such as a primitive-strip (strip) or primitive-fan (fan). Each strip or fan includes a number of vertices, optionally referenced using indexing, where some of the vertices are shared with neighboring primitives. The primitive extension includes an originating primitive, vertex data, and connectivity information, as described further herein. The primitive extension provides a general interface for describing a variety of connected primitives, including primitives supported in OpenGL®.

General programs operate on points, lines, triangles, and quadrilaterals, with or without neighbors and with or without edge data. A general program outputs a single type of primitive, including generalized strips or fans of primitives, and outputs a stream of vertices for such a primitive. A general program may operate on triangles or quadrilaterals generated by mesh and subdivision programs. Additionally, three-dimensional connected primitives, e.g., strips and fans, may be used, such as cube strips, and tetrahedron strips and fans. Generalized strips, such as triangle strips ("tri-strips"), triangle fans ("tri-fans") and quadrilateral-strips, are definable by width (w), step size (s) and anchor width (a). Table III provides w, s, a values for some examples for generating primitive extensions, as described further herein:

TABLE III

| Generalized Primitive | Width (w) | Step Size (s) | Anchor Width (a) |
|---|---|---|---|
| Point-Strip | 1 | 1 | 0 |
| Line-Strip | 2 | 1 | 0 |
| Tri-Strip | 3 | 1 | 0 |
| Tri-Fan | 3 | 1 | 1 |
| Quadrilateral-Strip | 4 | 2 | 0 |
| Quadrilateral-Fan | 4 | 2 | 1 |
| Tetrahedron-Strip | 4 | 1 | 0 |
| Tetrahedron-Fan (Anchored to Point) | 4 | 1 | 1 |
| Tetrahedron-Fan (Anchored to Edge) | 4 | 1 | 2 |
| Cube Strip | 8 | 4 | 0 |
| Pentagon Fan | 5 | 3 | 1 |
| Pentagon Strip | 5 | 3 | 0 |

For purposes of clarity, a tri-fan, quadrilateral-strip and a cube strip are described, as it will be apparent how other primitives and primitive volumes may be generated. Furthermore, though outlines of primitives are shown for purposes of clarity, it should be understood that such outlines may or may not be included in forming an image with face data. Additionally, though primitives with straight lines are shown, it should be appreciated that higher-order primitives may be used, such as patches, surfaces, and the like.

Figure 9A:
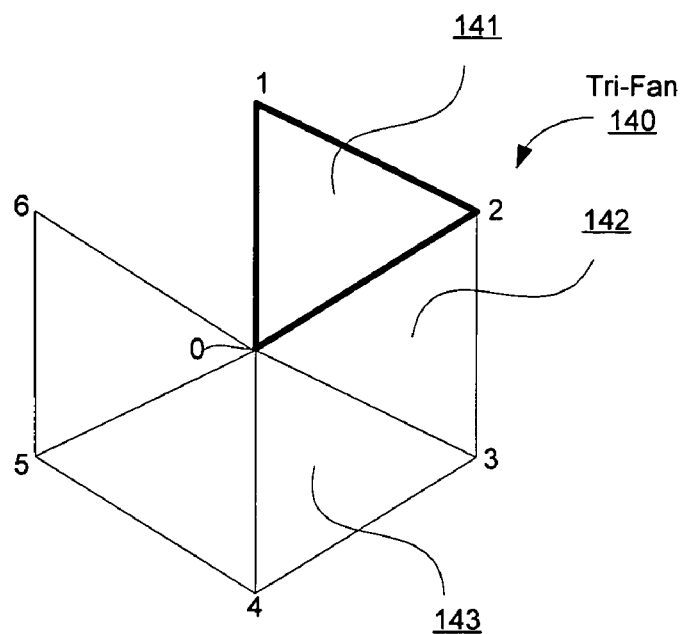
FIG. 9A depicts a line drawing of an exemplary embodiment of a tri-fan in accordance with one or more aspects of the invention.

FIG. 9A depicts a line drawing of an exemplary embodiment of a tri-fan 140 in accordance with one or more aspects of the invention. An originating triangle 141, shown with thicker lines, is used as input for generating tri-fan 140. Notably, depending on shape of originating triangle, tri-fan will vary, in terms of shape, number of sections, and size, among other data driven factors. Triangle 141 includes positional information for three vertices, labeled 0, 1, 2. These vertices 0, 1, 2 are labeled sequentially to indicate their sequential relationship to one another. Additionally, as triangles are added to form tri-fan 140, such triangles are added in a sequential manner, as indicated by numbering of vertices 3, 4, 5 and 6. As indicated above, a tri-fan is designated by 3-1-1 for w-s-a, respectively. A width, "w" indicates a number of vertice(s) to form originating and adjoining primitives. A step size, "s" indicates a number of vertice(s) to be added to either an originating primitive or an adjoining primitive to form either an adjoining primitive or an additional adjoining primitive, respectively. An anchor width, "a" indicates a number, possibly zero, of anchor vertice(s) to be used. Anchor vertice(s) are used to form a portion of the originating primitive and a portion of each adjacent primitive.

In the example of FIG. 9A, an originating primitive triangle 141 has three vertices, and w equals 3. As a tri-fan 140 is to be generated, one anchor vertex, vertex 0 is used, and a equals 1. Additional adjacent triangle primitives are added, by including one additional "new" vertex, such as vertex 3, to include another triangle, triangle 142, in the tri-fan. Therefore, the step size, s is the number of "new" vertices, i.e., vertices that have not been used to define a primitive, needed to define each adjacent primitive. The step size for a tri-fan is 1. Thus, a tri-fan primitive may be defined using w, s, and a. The number of vertices that are shared between two adjacent primitives is (w-s). The number of vertices, in addition to any anchor vertices, needed to define an adjacent primitive is (w-a). The tri-fan may be generated by a hardware processing engine or processed by a hardware processing engine. A generalized primitive, such as a tri-fan, may be provided by a user through an application program interface (API), where values for w, s, and a are user provided or a user selects a primitive generation mode.

Figure 9B:
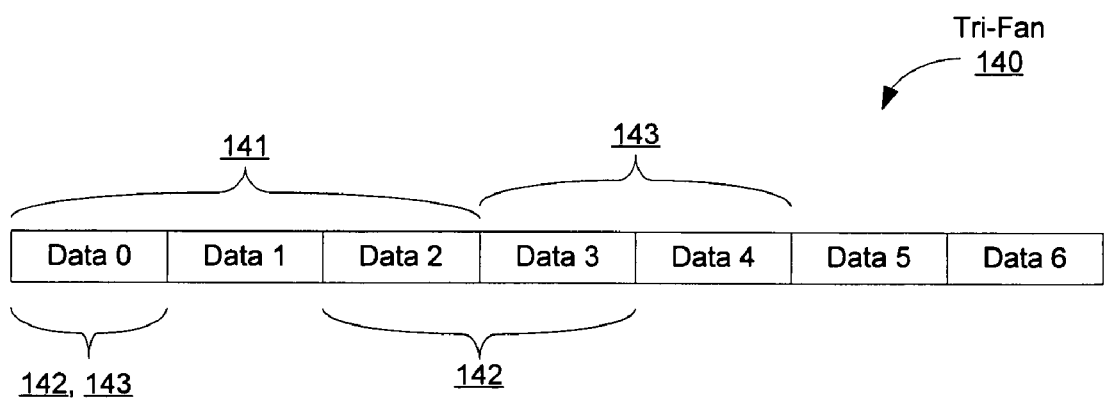
FIG. 9B depicts an exemplary embodiment of the tri-fan as a data stream in accordance with one or more aspects of the invention.

FIG. 9B depicts an exemplary embodiment of tri-fan 140 as a data stream in accordance with one or more aspects of the invention. In one embodiment, the data stream is received by a hardware processing engine. In an alternate embodiment, the data stream is output by a hardware processing engine. Though tri-fan 140 is shown in FIG. 9A as a geometric object for display, it should be understood that tri-fan 140 may be represented as a sequence of data elements in a data stream. Thus, data for vertices 0, 1 and 2 of triangle 141 are data 0, data 1 and data 2, respectively. As known, data at a vertex may include attributes other than position, such as texture coordinates, normal vectors, and the like. A data stream may include data elements defining a single primitive or a generalized primitive including two or more primitives.

Continuing the example, data 0 corresponding to anchor vertex, vertex 0, is used to define adjacent triangle primitive 142. Because the step size is one, data 1 corresponding to vertex 1 is not used, i.e., is "stepped" over, to define adjacent triangle primitive 142. Step size, s, is thus a number of data units to skip or increment for each adjacent primitive. So, for example, in generation of triangle primitive 142 three vertices are needed as specified by width, w. Therefore, in addition to data 0 corresponding to anchor vertex, vertex 0, data 2 corresponding to vertex 2 and data 3 corresponding to vertex 3 are used to define triangle primitive 142. Likewise, in generation of triangle primitive 143, data 2 corresponding to vertex 2 is skipped and data 3 corresponding to vertex 3 and data 4 corresponding to vertex 4 are used along with data 0 corresponding to vertex 0 to define triangle primitive 143.

This process is continued to define additional adjacent triangle primitives within the tri-fan until a specified number of primitives are generated. In the example of FIG. 9B five primitives are generated. For strip-type generalized primitives, e.g., tri-strip, quadrilateral-strip, and the like, a specified or default number of primitives may be predetermined or computed by a program. Alternatively, strip-type generalized primitives may be generated sufficient to at least approximately cover a surface. With respect to fans, a user may specify a number indicating a portion of the fan is to be completed, namely, a number of primitives. Alternatively, a fan-type generalized primitive may be generated sufficient to at least approximately cover a surface. Thus, tessellation or a number of primitives generated for a strip-type generalized primitive or fan-type generalized primitive may be specified by a user, including a user-defined program, or by a predetermined default value.

Figure 10A:
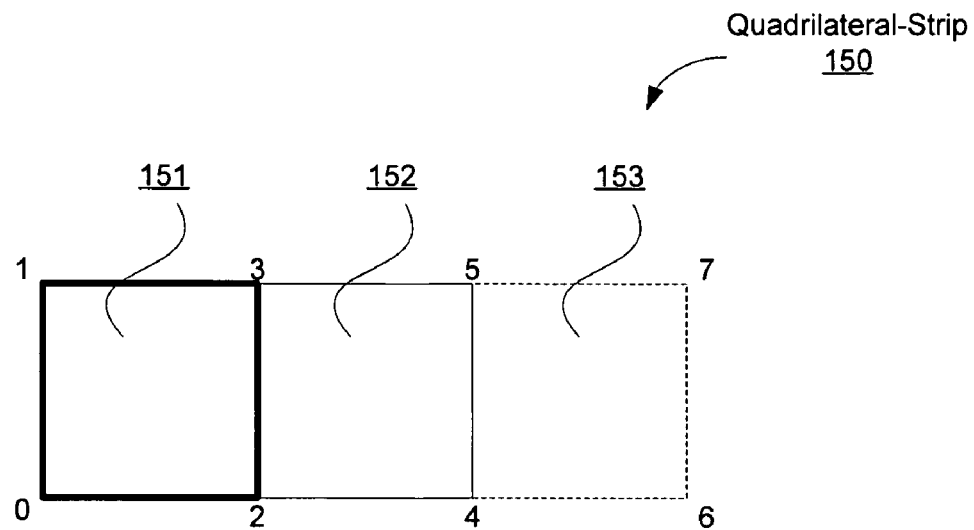
FIG. 10A depicts a line drawing of an exemplary embodiment of a quadrilateral-strip in accordance with one or more aspects of the invention.

FIG. 10A depicts a line drawing of an exemplary embodiment of a strip-type generalized primitive, quadrilateral-strip 150 in accordance with one or more aspects of the invention. Quadrilateral-strip 150 is formed from an originating quadrilateral primitive 151. Quadrilateral 151 is defined by vertices 0, 1, 2 and 3. From quadrilateral 151, other quadrilateral primitives are generated. Quadrilateral 152 is defined by vertices 2 and 3, from quadrilateral 151, and generated vertices 4 and 5. Quadrilateral 153 is defined by vertices 4 and 5, from quadrilateral 152, and generated vertices 6 and 7. Though two generated quadrilaterals 152 and 153 are shown, quadrilateral primitive 153 is shown with dashed-lines to indicate that additional quadrilateral primitives may be included within quadrilateral-strip 150. A target number of primitives for a fan-type generalized primitive or strip-type generalized primitive may be set according to an image to be rendered. Additionally, a minimum number of primitives may be specified by a user or computed by a program.

Figure 10B:
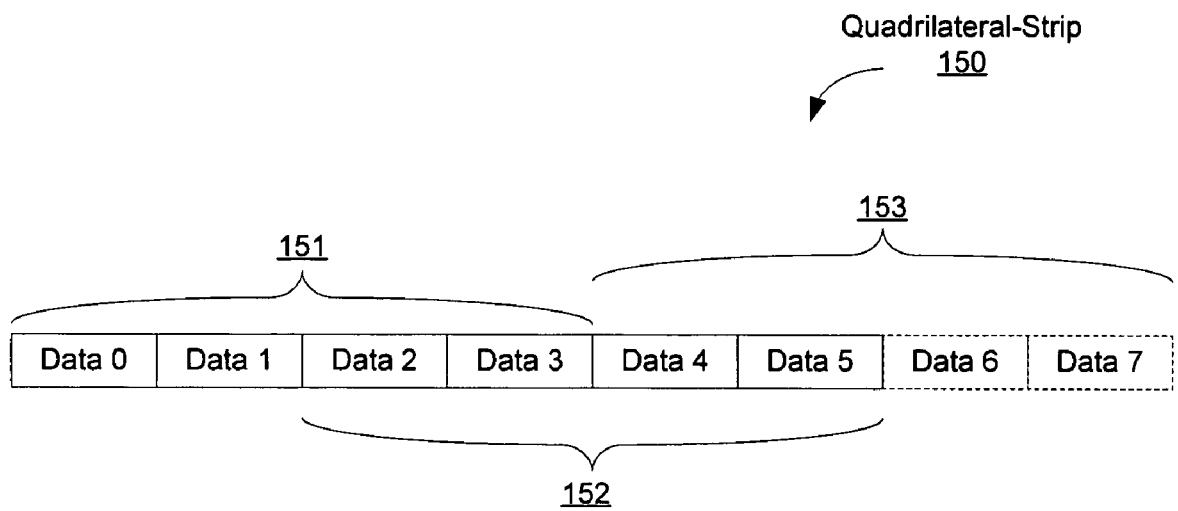
FIG. 10B depicts an exemplary embodiment of the quadrilateral-strip as a data stream in accordance with one or more aspects of the invention.

FIG. 10B depicts an exemplary embodiment of quadrilateral-strip 150 as a data stream in accordance with one or more aspects of the invention. Recall, a quadrilateral strip has a w-s-a of 4-2-0. So, in the example, data 0, 1, 2 and 3 describe quadrilateral 151, namely, a quadrilateral has a width, w, of four vertices. Notably, in a quadrilateral strip the anchor width, a, is zero and the step size, s, is two. Therefore, two data units, data 0 and data 1, are skipped to define adjacent primitive quadrilateral 152. Because the anchor width is zero, generation of quadrilateral 152 starts with data 2 corresponding to vertex 2, and includes a total of four data units, for a width, w, of four, namely, four vertices. Accordingly, quadrilateral 152 is described by data 2, 3, 4, and 5 corresponding to vertices 2, 3, 4, and 5 respectively. For generation of an additional adjacent primitive, quadrilateral 153, another step size increment is applied to the data stream. In the example, as data 0 and data 1 were skipped to define quadrilateral 152, two more data units, data 2 and data 3, are skipped to define quadrilateral 153. Accordingly, quadrilateral 153 is described by data 4, 5, 6, and 7 corresponding to vertices 4, 5, 6, and 7.

Figure 11A:
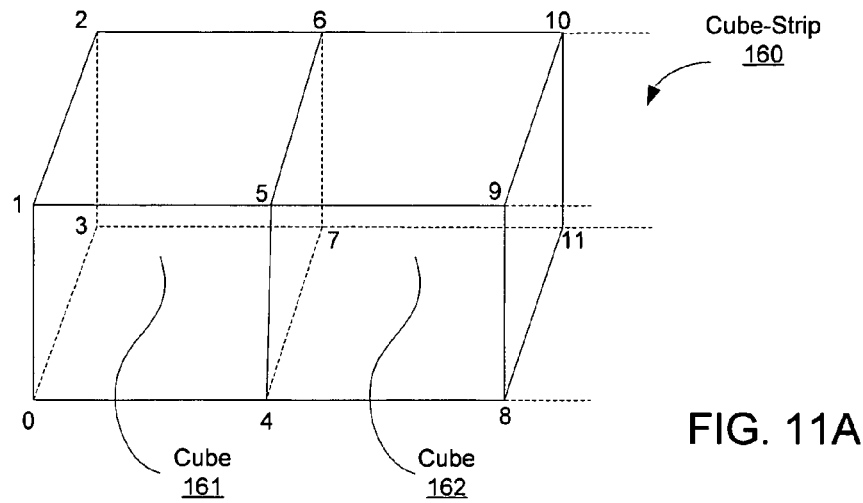
FIG. 11A depicts a line drawing of an exemplary embodiment of a cube-strip in accordance with one or more aspects of the invention.

FIG. 11A depicts a line drawing of an exemplary embodiment of a strip-type generalized primitive, cube-strip 160 in accordance with one or more aspects of the invention. Cube-strip 160 includes at least two cube primitives, cube 161 and cube 162. Cube 161 is defined by vertices 0 through 7, and cube 162 is defined by vertices 4 through 11. Notably, vertices 4, 5, 6, and 7 are shared by cube 161 and cube 162, additionally faces defined by vertices 4, 5, 6, and 7 of each of cubes 161 and 162 are shared faces. However, these shared faces may not be used as they are within the volume of cube-strip 160.

Figure 11B:
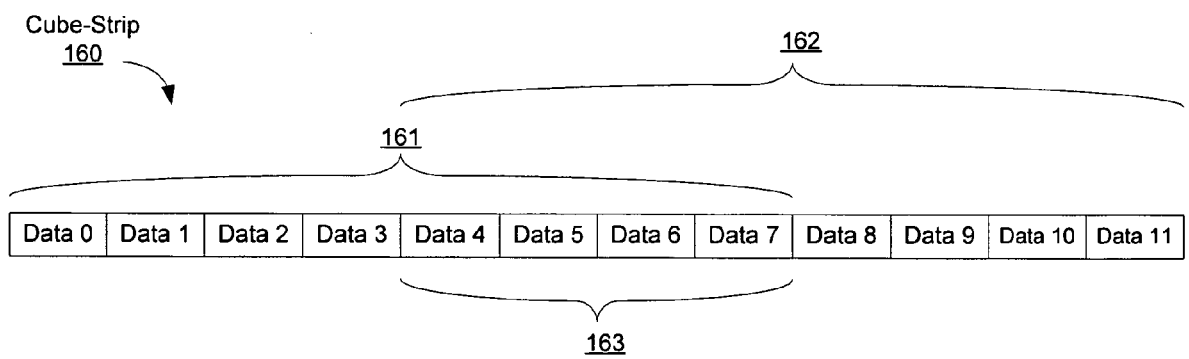
FIG. 11B depicts an exemplary embodiment of the cube-strip as a data stream in accordance with one or more aspects of the invention.

FIG. 11B depicts an exemplary embodiment of cube-strip 160 as a data stream in accordance with one or more aspects of the invention. Cube 161 defined by 8 vertices as specified by a width, w, of eight and cube 161 is described with data corresponding to vertices 0 through 7. Because the step size, s, for a cube-strip is four, four data units, specifically data 0, data 1, data 2, and data 3 are skipped to define cube 162. The anchor width, a, for a cube-strip is zero. Therefore, cube 162 is described with data corresponding to vertices 4 through 11, specifically data 4, data 5, data 6, data 7, data 8, data 9, data 10, and data 11. Because a shared face 163 defined by vertices 4, 5, 6, and 7 may not be used, face data may be removed from data 4, 5, 6, and 7 for processing efficiency.

Figure 12A:
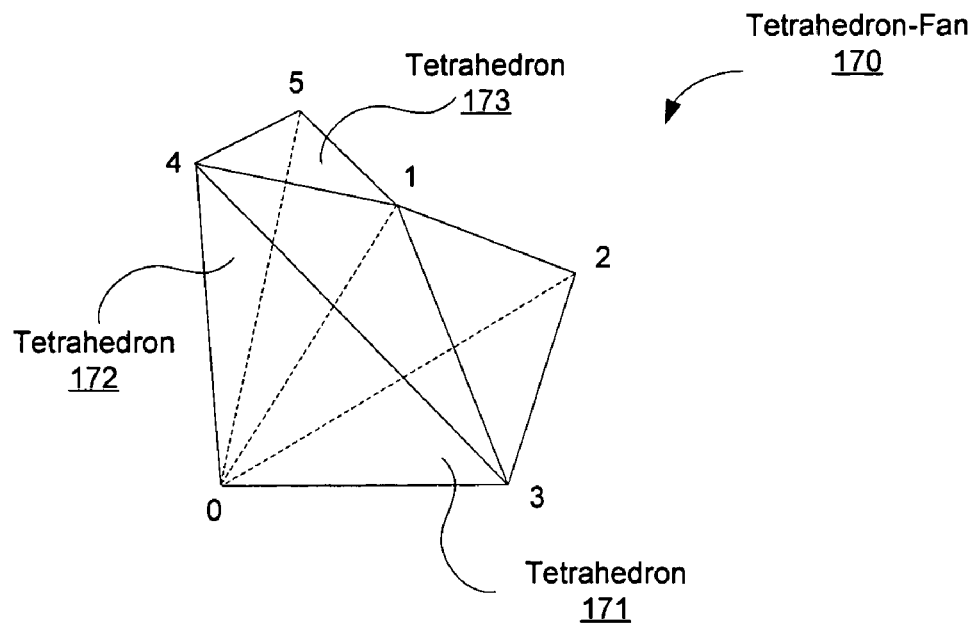
FIG. 12A depicts a line drawing of an exemplary embodiment of a tetrahedron-fan in accordance with one or more aspects of the invention.

FIG. 12A depicts a line drawing of an exemplary embodiment of a fan-type generalized primitive, tetrahedron-fan 170 in accordance with one or more aspects of the invention. Tetrahedron-fan 170 is anchored to an edge and includes at least two tetrahedron primitives, tetrahedron 171, tetrahedron 172, and tetrahedron 173. Tetrahedron 171 is defined by vertices 0 1, 2, and 3, tetrahedron 172 is defined by vertices 0, 1, 3, and 4, and tetrahedron 173 is defined by vertices 0, 1, 4, and 5. Notably, vertices 0 and 1, defining an edge, are shared by tetrahedron 171, tetrahedron 172, and tetrahedron 173.

Figure 12B:
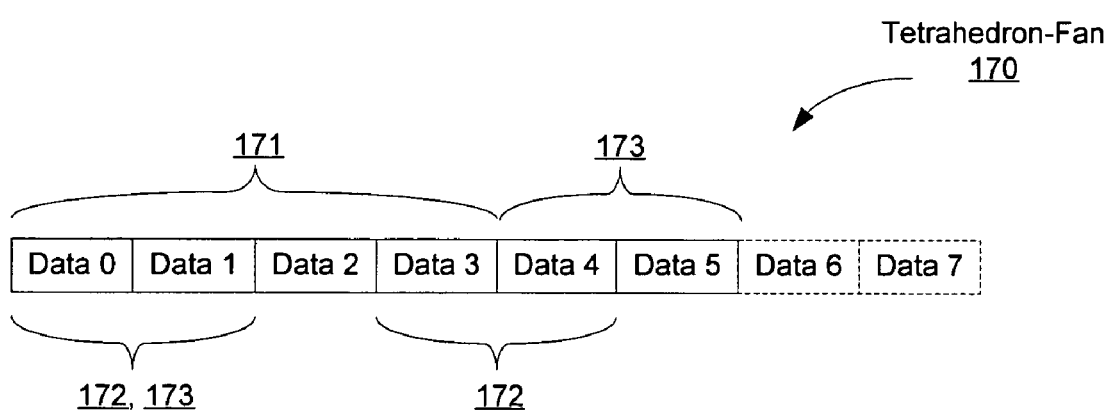
FIG. 12B depicts an exemplary embodiment of the tetrahedron-fan as a data stream in accordance with one or more aspects of the invention.

FIG. 12B depicts an exemplary embodiment of tetrahedron-fan 170 as a data stream in accordance with one or more aspects of the invention. Tetrahedron 171 defined by 4 vertices as specified by a width, w, of four and tetrahedron 171 is described with data corresponding to vertices 0, 1, 2, and 3. The anchor width, a, for a tetrahedron-fan is two, so vertex 0 and vertex 1 are anchor vertices. Because the step size, s, for a tetrahedron-fan anchored to an edge is one, one data unit, specifically data 2, is skipped to define tetrahedron 172. Therefore, tetrahedron 172 is described with data 0, data 1, data 3, and data 4 corresponding to vertex 0, vertex 1, vertex 3, and vertex 4, respectively. Likewise, data 3 is skipped to define tetrahedron 173. Therefore, tetrahedron 173 is described with data 0, data 1, data 4, and data 5 corresponding to vertex 0, vertex 1, vertex 4, and vertex 5, respectively.

Vertex indexing, including indexing of vertex one-ring neighbors and edges may be used to enhance vertex processing by a vertex engine and provide a general purpose definition of vertices within a generalized primitive including strip-type primitives and fan-type primitives. Vertex indexing facilitates reuse of vertex data when a vertex is shared between primitives within a generalized primitive. Furthermore, offset indexing may be used to specify computational order, reducing the occurrence of geometric artifacts introduced during primitive processing.

The invention has been described above with reference to specific embodiments. Persons skilled in the art will recognize, however, that various modifications and changes may be made thereto without departing from the broader spirit and scope of the invention as set forth in the appended claims. For example, in alternative embodiments, the indexing techniques set forth herein may be implemented either partially or entirely in a software program. The foregoing description and drawings are, accordingly, to be regarded in an illustrative rather than a restrictive sense. The listing of steps in method claims do not imply performing the steps in any particular order, unless explicitly stated in the claim. Within the claims, element lettering (e.g., "a)", "b)", "i)", "ii)", etc.) does not indicate any specific order for carrying out steps or other operations; the lettering is included to simplify referring to those elements.

The invention claimed is:

1. A method for execution by a data processor for indexing and storing vertex data associated with the vertices that define neighboring primitives to enhance primitive processing by the processor, comprising:

selecting a reference vertex;

identifying one-ring neighbor vertices of the reference vertex;

assigning a unique reference to each of the one-ring neighbor vertices;

assigning a unique neighbor index to each of the one of the one-ring neighbor vertices in a sequential order around the reference vertex;

storing the neighboring primitives associated with the one-ring neighbor vertices based on the assigned neighbor indexes, wherein the unique neighbor index includes a user-specified offset relative to each of the neighboring primitives, the offset being used to specify a consistent order of calculation of the neighboring primitives by ordering the one-ring neighbor vertices for use during primitive processing; and displaying the primitives.

2. The method for indexing as in claim 1, wherein the at least one primitive defines a volume.

3. The method for indexing as in claim 1, further comprising identifying an edge between a first vertex and a second vertex, the second vertex being a one-ring neighbor of the first vertex.

4. The method for indexing as in claim 3, further comprising:

assigning the unique reference of the first vertex to the edge; and assigning the unique neighbor index of the second vertex to the edge.

5. The method for indexing as in claim 4, further comprising:

assigning the unique reference of the second vertex to the edge; and assigning the unique neighbor index of the first vertex to the edge.

6. The method for indexing as in claim 1 wherein edges are referenced in relation to a selected vertex of an originating primitive and one neighbor vertex of the selected reference vertex.

7. The method for indexing as in claim 1 wherein one or more vertex of the primitive is stored in only one location and is accessible in more than one way based on one of the unique neighbor indexes.

8. The method for indexing as in claim 7 including storing a valence for the reference vertex defining the number of one-ring neighbor vertices for the reference vertex.

9. The method for indexing as in claim 8, wherein the polygonal primitive is a triangular primitive.

10. The method for indexing as in claim 9 wherein edge data defining each edge of the triangular primitive is referenced in one of two ways.

11. The method for indexing as in claim 8 wherein direction of ordering of neighbor indexes is user specified.

12. The method for indexing as in claim 8 wherein the valence is the number of vertices that share an edge with the reference vertex and is stored with a modulo of the reference vertex to determine the neighbor index, where modulo is a total number of one-ring neighbors of one of the neighbor vertices.

13. The method for indexing as in claim 12, wherein the primitive is a quadrilateral primitive.

14. The method for indexing as in claimed in claim 13 wherein the indexing of neighboring quadrilateral primitives is redundant but that storage of the index data is not redundant.

15. The method for indexing as in claimed in claim 1 including storing edge data for each neighbor primitive to a reference primitive, wherein only edges adjacent to or shared by a user selected reference vertex of the reference primitive are defined as one of the neighbor primitives.

16. The method for indexing as in claimed in claim 15 wherein the offset is used to reference control points related to the stored vertex data, wherein the control point includes at least one attribute chosen from the groups consisting of position coordinates and texture coordinates.

17. A method for execution by a data processor for indexing vertex data defining at least one primitive to enhance primitive processing by the processor, comprising:

assigning a unique reference to each vertex defining the at least one primitive;

identifying one-ring neighbor vertices of each vertex;

assigning the unique reference to each of the one-ring neighbor vertices of each vertex;

assigning a unique neighbor index to each of the one of the one-ring neighbor vertices of each vertex wherein a unique neighbor index includes a user-specified offset to specify an order of calculation in primitive processing: and storing the primitives for display.

18. The method of claim 17 wherein the offset is determined by the number of one-ring neighbor vertices to a reference vertex.

19. The method of claim 18 wherein the offset determines the sequence with which the neighboring primitives are processed.

* * * * *

UNITED STATES PATENT AND TRADEMARK OFFICE
CERTIFICATE OF CORRECTION

PATENT NO. : 7,324,105 B1 Page 1 of 1
APPLICATION NO. : 10/727679
DATED : January 29, 2008
INVENTOR(S) : Moreton et al.

It is certified that error appears in the above-identified patent and that said Letters Patent is hereby corrected as shown below:

In Column 16, Line 61, please replace "as in claimed in" with --as claimed in--.

In Column 16, Line 65, please replace "as in claimed in" with --as claimed in--.

In Column 17, Line 3, please replace "as in claimed in" with --as claimed in--.

Signed and Sealed this

Twenty-eighth Day of October, 2008

JON W. DUDAS
*Director of the United States Patent and Trademark Office*